March 12, 1957  M. G. RIGBY ET AL  2,784,764
ADJUSTABLE SEAT SUPPORTS
Filed Oct. 11, 1955  4 Sheets-Sheet 1

INVENTORS.
Miles G. Rigby
Elmer A. Herider
BY
THEIR ATTORNEYS

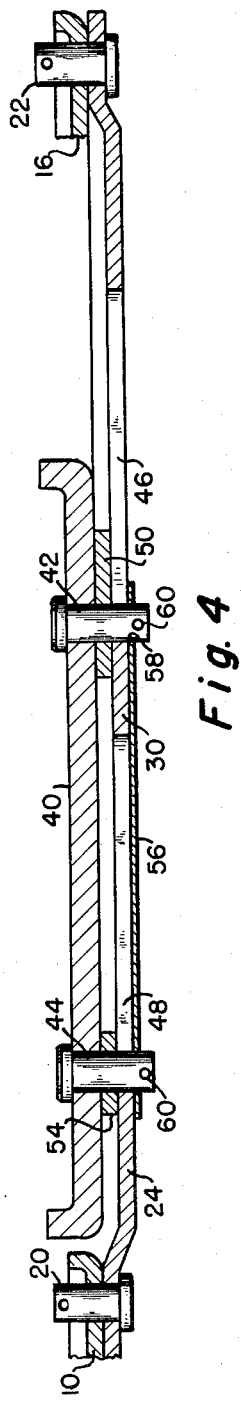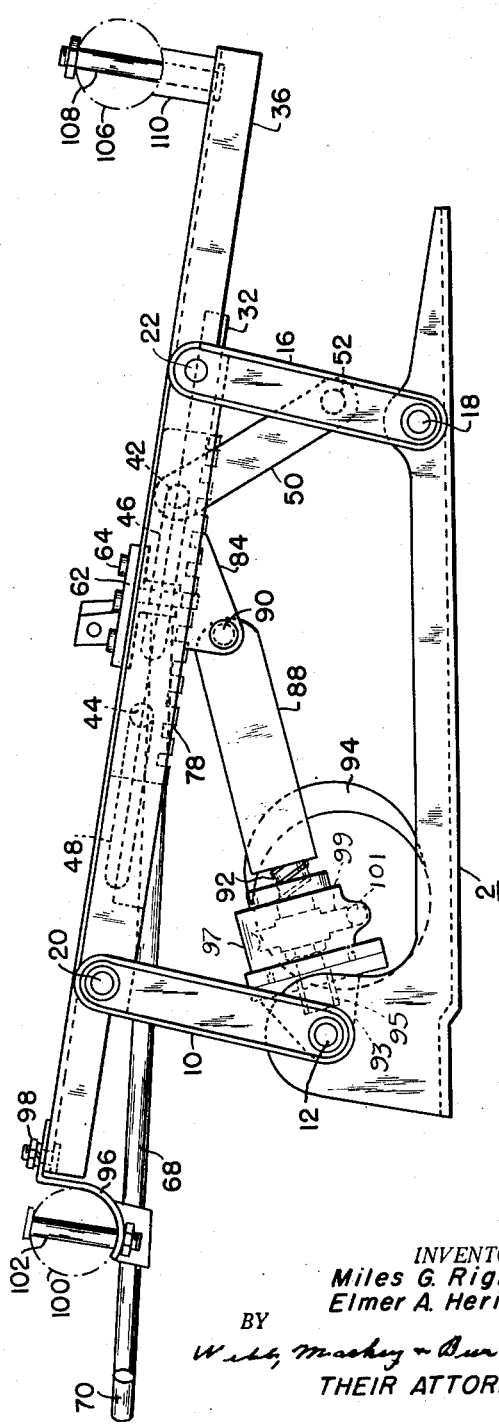

March 12, 1957 M. G. RIGBY ET AL 2,784,764
ADJUSTABLE SEAT SUPPORTS
Filed Oct. 11, 1955 4 Sheets-Sheet 3

INVENTORS.
Miles G. Rigby
Elmer A. Herider
BY
THEIR ATTORNEYS

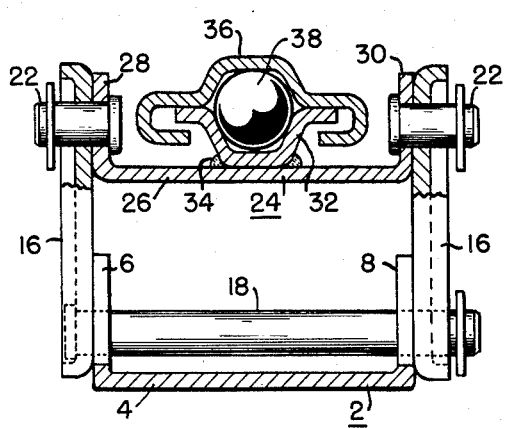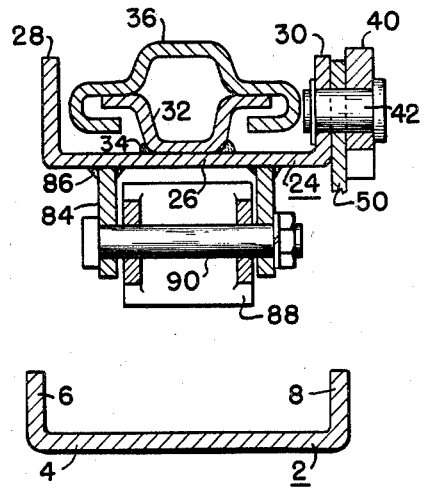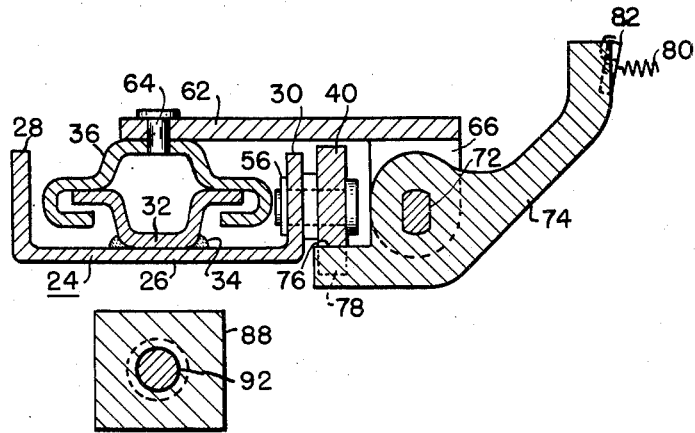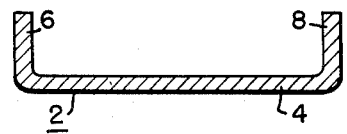

United States Patent Office 2,784,764
Patented Mar. 12, 1957

2,784,764

ADJUSTABLE SEAT SUPPORTS

Miles G. Rigby, Birmingham, and Elmer A. Herider, Dearborn Township, Wayne County, Mich., assignors to Rockwell Spring and Axle Company, Coraopolis, Pa., a corporation of Pennsylvania Application October 11, 1955, Serial No. 539,893

4 Claims. (Cl. 155—14)

This invention relates to a seat support which is adjustable both vertically and fore and aft. It is particularly adapted for use in supporting the seat of an automobile. The invention is illustrated as embodying a one-sided seat support, i. e., a support which supports only one side of the seat. If desired, a similar structure may be used at each side of the seat so that both sides of the seat may be raised or lowered and moved fore and aft.

In the accompanying drawings which illustrate a preferred embodiment of our invention, Figure 1 is a plan view of the adjustable seat support;

Figure 3 is a view similar to Figure 2 but showing the seat support in its raised position;

Figure 4 is a partial longitudinal section taken on the line IV—IV of Figure 2, on an enlarged scale;

Figures 6, 7 and 8 are enlarged transverse sections taken respectively on the lines VI—VI, VII—VII and VIII—VIII of Figure 2.

Figure 1:
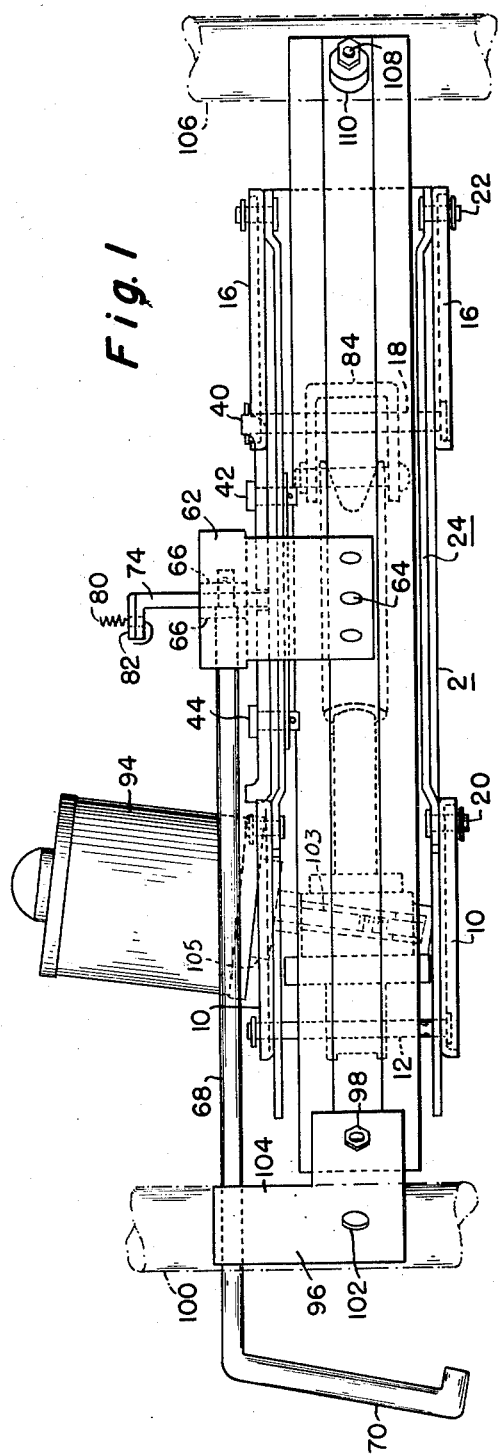

Referring more particularly to the accompanying drawings, the seat support comprises a base 2 adapted to be secured to the floor of a vehicle or to other suitable support. The base is channel shaped in cross section as shown in Figures 5–8 and comprises a web 4 and two upstanding side flanges 6 and 8. Two front supporting links 10 are pivotally connected adjacent their lower ends to the base 2 by means of a pin 12 mounted in the upstanding flanges 14 of the base. Each one of a pair of rear supporting links 16 is pivotally connected adjacent its lower end to the base 2 by means of a pin 18 mounted in the base. The supporting links 10 and 16 are pivotally connected adjacent their upper ends by means of pins 20 and 22, respectively, to a carrier indicated generally by reference numeral 24. This carrier is channel shaped and comprises a web 26 and two side flanges 28 and 30.

A lower rail 32 is rigidly secured to the carrier 24 by welding 34. An upper rail 36 is movably supported on the lower rail by means of ball bearings 38 interposed between the upper and lower rails.

A rack 40 is supported from the carrier 24 as shown more particularly in Figure 4. The rack 40 is supported in such manner from the carrier 24 that the carrier is free to move fore and aft relative to the rack. As shown in Figure 4, two pins 42 and 44 are secured to the rack and extend respectively through two slots 46 and 48 formed in the right-hand upstanding flange 30 of the carrier 24. A stabilizing link 50 is pivotally connected adjacent its lower end by a pin 52 to an intermediate portion of the right-hand rear supporting link 16. The upper end of the stabilizing link is pivotally connected to the pin 42. The upper end of the stabilizing link is sandwiched between the rack 40 and the right-hand flange 30 of the carrier 24. A spacer 54 is disposed between the rack 40 and the carrier 24 adjacent the pin 44. A guide plate 56 is located inside of the flange 30 of the carrier 24 and is secured adjacent its ends to the pins 42 and 44 by means of holes 58 formed in the guide plate and pins 60. As hereinafter described, in raising or lowering the seat support, the carrier 24 moves fore and aft relative to the rack 40 and in such movement the flange 30 of the carrier 24 is guided on one side by the guide plate 56 and on the other side by the spacer 54 and the upper end of the stabilizing link 50.

As shown in Figures 1 and 8, a bracket 62 is secured by rivets 64 to the upper rail 36. This bracket has two downwardly extending spaced-apart ears 66 which provide bearings for an operating rod 68 having a handle 70. The portion of the shaft 68 between the ears 66 is milled with flat surfaces 72 which fit a correspondingly shaped opening in a latch 74 so that when the operating handle 70 is rotated the latch 74 likewise is rotated. The latch has a finger portion 76 which fits into any one of a number of slots 78 formed in the lower edge of the rack 40. The latch is normally maintained in engagement with the rack 40 by means of a tension spring 80 secured to a wing 82 on the latch and to a fixed support not shown. Depressing the handle 70 rotates shaft 68 in such manner as to release the latch from the rack 40. When the latch is released from the rack, the upper rail 36 can be moved fore or aft on the lower rail 32 in the usual manner while supported by the ball bearings 38.

Figure 2:
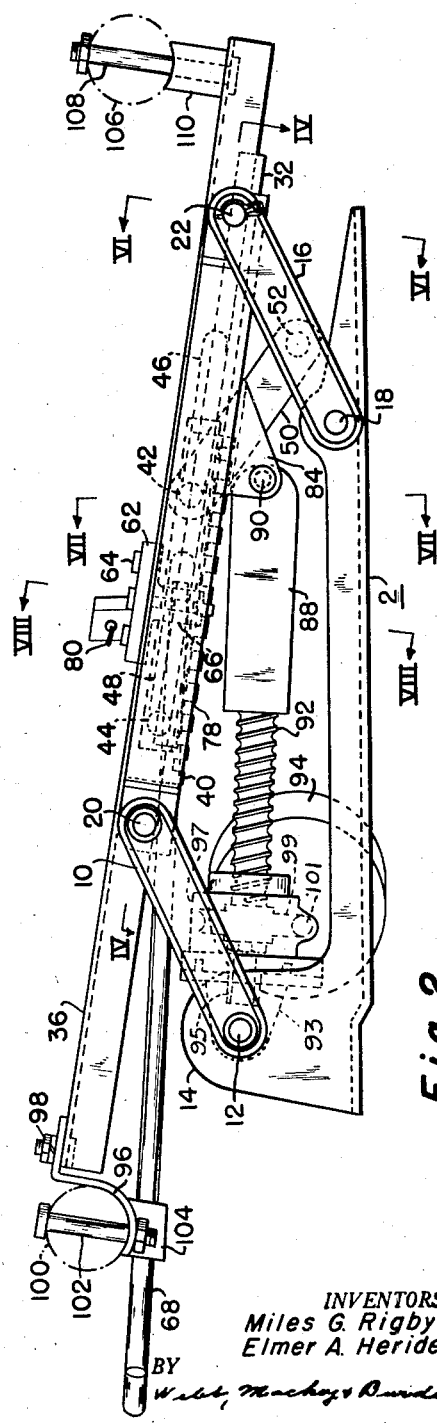
Figure 2 is a side elevation of the seat support shown in Figure 1, the seat support being in its lower position.
Figure 5:
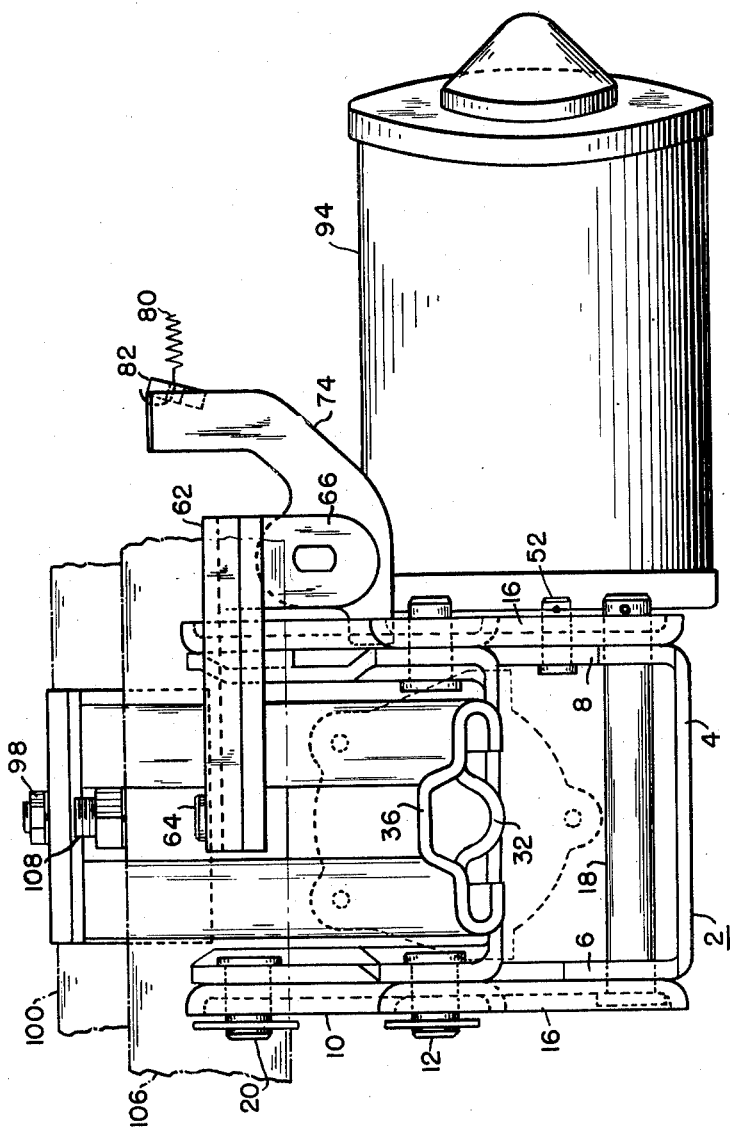
Figure 5 is a rear elevation of the seat support shown in Figures 1 and 2.

A bracket 84 is secured by welding 86 to the underside of the carrier 24. An elongated nut 88 is pivotally connected to the bracket 84 by a pin 90. The nut receives one end of a screw 92. The other end of screw 92 has a bearing portion 93 mounted in a bearing 95 carried by a gear case 97. A worm gear 99 is rigidly secured to the screw 92 and is driven by a worm 101 secured to the drive shaft 103 of a motor (not shown) located in a motor housing 94. The motor housing 94 and the gear case 97 are rigidly connected together by a connecting piece 105 (Fig. 1) so that the motor housing moves with the gear case in raising and lowering the seat support as hereinafter described. When the motor drive shaft 103 is operated, it rotates screw 92 by means of the worm 101 and worm wheel 99 fixed to the screw. Upon rotation of the screw in one direction the pin 90 is moved toward the right as viewed in Figure 2 and upon rotation of the screw in the other direction the pin 90 is moved to the left.

A bracket 96 is secured to the front end of the upper rail 36 by a bolt and nut 98. A front tube 100 of a seat assembly is secured to the bracket 96 by a bolt 102. The bracket 96 has a wing portion 104 which forms a bearing for the operating rod 68. A rear tube 106 of a seat assembly is secured to the rear end of the upper rail 36 by a bolt 108 and a bushing 110.

The operation of raising or lowering the upper rail 36 in a vertical direction without fore or aft movement of the rail is as follows. Assuming that the seat support is in its lower position shown in Figure 2 and it is desired to raise the seat support, the screw 92 is rotated in a direction to move the nut 88 and pin 90 to the left, i. e., in such direction as to shorten the distance between the pin 90 and the pin 12 which connects the front links 10 to the base 2. Since the bracket 84 is secured to the carrier 24 and the lower rail 32 is secured to the carrier, both the carrier and the lower rail move to the left and cause the supporting links 10 and 16 to rotate in a counterclockwise direction about their pivots 12 and 18, respectively, to the base 2. During this movement of the supporting links, carrier 24 and lower rail 32, the upper rail 36 rises vertically but does not move fore or aft relative to the base 2. Fore or aft movement of the upper rail 36 is prevented by the stabilizing link 50, the upper end of which is pivotally connected to the pin 42 which is secured in the rack 40. During counterclockwise rotation of the supporting links 10 and 16 from the position shown in Figure 2 to the position shown in Figure 3, the carrier 24 and the lower rail 32 move to the left but the rack 40 is prevented from moving forwardly by the stabilizing link 50. During this movement, the slots 46 and 48 allow movement of the carrier 24 relative to the rack 40, the pins 42 and 44 sliding in the slots 46 and 48, respectively. Since the latch 74 is in engagement with the rack 40 and since the rack is prevented from forward movement by the stabilizing link, the bracket 62 and upper rail 36 are prevented from moving forwardly. Thus, every point on the upper rail 36 moves upwardly in a vertical direction. The seat support is lowered to the position shown in Figure 2 by reversing the direction of rotation of the screw 92 so as to lengthen the distance between the pins 12 and 90.

The invention is not limited to the preferred embodiment but may be otherwise embodied or practiced within the scope of the following claims.

We claim:

1. An adjustable seat support comprising a base, a carrier located above said base, supporting links pivotally connected to said base and carrier for supporting said carrier from said base, a lower rail rigidly connected to said carrier, an upper rail movably supported on said lower rail, a rack supported by said carrier, said carrier being movable fore and aft relative to said rack, means for locking said upper rail to said rack, a stabilizing link pivotally connected to one of said supporting links and pivotally connected to said rack, and means for moving said carrier fore and aft relative to said base to raise and lower said seat support.

2. An adjustable seat support comprising a base, a carrier located above said base, supporting links pivotally connected to said base and carrier for supporting said carrier from said base, a lower rail rigidly connected to said carrier, an upper rail movably supported on said lower rail, a rack, a pin and slot connection between said carrier and said rack for supporting said rack from said carrier while allowing relative fore and aft movement of said carrier and rack, a stabilizing link pivotally connected to one of said supporting links and pivotally connected to said rack, and means for moving said carrier fore and aft relative to said base to raise and lower said seat support.

3. An adjustable seat support comprising a base, a carrier located above said base, supporting links pivotally connected to said base and carrier for supporting said carrier from said base, a lower rail rigidly connected to said carrier, an upper rail movably supported on said lower rail, a rack, a pin fixed to said rack, said carrier having a slot for receiving said pin and allowing fore and aft movement between said carrier and said rack, means for locking said upper rail to said rack, a stabilizing link pivotally connected to one of said supporting links and pivotally connected to said rack, and means for moving said carrier fore and aft relative to said base to raise and lower said seat support.

4. An adjustable seat support comprising a base, a carrier located above said base, supporting links pivotally connected to said base and carrier for supporting said carrier from said base, a lower rail rigidly connected to said carrier, an upper rail movably supported on said lower rail, a latch carried by said upper rail, a latch keeper supported by said carrier, said carrier being movable fore and aft relative to said latch keeper, means for operating said latch to lock it with said latch keeper, a stabilizing link pivotally connected to one of said supporting links and pivotally connected to said latch keeper, and means for moving said carrier fore and aft relative to said base to raise and lower said seat support.

References Cited in the file of this patent

UNITED STATES PATENTS 2,149,946  Whedon et al. _____ Mar. 7, 1939